(12) United States Patent
Cadaux

(10) Patent No.: US 6,438,372 B1
(45) Date of Patent: Aug. 20, 2002

(54) SYSTEM FOR THE OBSERVATION OF TRAFFIC

(75) Inventor: Nathalie Cadaux, Boulogne (FR)

(73) Assignee: France Telecom, Paris (FR)

( * ) Notice: Subject to any disclaimer, the term of this patent is extended or adjusted under 35 U.S.C. 154(b) by 0 days.

(21) Appl. No.: 09/150,627

(22) Filed: Sep. 9, 1998

(30) Foreign Application Priority Data

Sep. 12, 1997 (FR) .............................................. 97 11409

(51) Int. Cl.$^7$ ................................................. H04Q 7/34
(52) U.S. Cl. ...................... 455/423; 455/67.1; 455/424; 370/244; 379/1
(58) Field of Search .................. 455/424, 423, 455/560, 561, 67.1, 524, 9, 67.3; 379/1, 22, 34; 370/244, 242, 245

(56) References Cited

U.S. PATENT DOCUMENTS

| | | | | |
|---|---|---|---|---|
| 4,424,421 A | * | 1/1984 | Townsend et al. | 370/248 |
| 4,860,281 A | | 8/1989 | Finley et al. | 370/15 |
| 5,134,643 A | * | 7/1992 | Iwata | 455/423 |
| 5,287,506 A | * | 2/1994 | Whiteside | 714/39 |
| 5,373,501 A | * | 12/1994 | Roland | 455/9 |
| 5,375,159 A | * | 12/1994 | Williams | 455/67.1 |
| 5,410,753 A | | 4/1995 | Szabo | 455/67.4 |
| 5,457,729 A | * | 10/1995 | Hamann et al. | 455/9 |
| 5,481,588 A | * | 1/1996 | Rickli et al. | 379/32 |
| 5,710,980 A | * | 1/1998 | Ueda | 455/67.4 |
| 5,978,659 A | * | 11/1999 | Kim | 455/67.1 |
| 5,987,306 A | * | 11/1999 | Nilsen et al. | 455/67.1 |
| 6,091,950 A | * | 7/2000 | Remy | 455/423 |

FOREIGN PATENT DOCUMENTS

| | | |
|---|---|---|
| DE | 42 05 239 | 8/1993 |
| EP | 0 710 043 | 5/1996 |
| EP | 0 738 091 | 10/1996 |
| FR | 2753596 | 3/1998 |

\* cited by examiner

*Primary Examiner*—Lee Nguyen
(74) *Attorney, Agent, or Firm*—Nilles & Nilles SC

(57) ABSTRACT

The present invention relates to test transmitter for verifying the positioning of antennas in a mobile telecommunications system and a method for manufacturing such a test transmitter that is particularly well suited for indoor use. A mobile terminal is modified so that it can transmit in the downlink frequency band, and preferably so that it can transmit one or more of the signal types used for downlink signalling, used in the mobile telecommunications system.

16 Claims, 4 Drawing Sheets

SYSTEM FOR THE OBSERVATION OF TRAFFIC

BACKGROUND OF THE INVENTION

1. Field of the Invention

The present invention relates to a system for the observation of the traffic in a mobile radiocommunications network such as the GSM (Global System of Mobile Communications).

2. Description of the Prior Art

It will be recalled, for a clearer understanding of the rest of this document, that a network of this kind combines primarily two subsystems as shown in the drawing of FIG. 1:

the B.S.S. radio subsystem (Base Station Subsystem), the N.S.S. switching and routing subsystem (Network and Switching Subsystem), The B.S.S. subsystem provides for the distribution of the radiocommunications network. It is constituted by base transceiver stations (B.T.S.) managed by a base station controller (B.S.C.).

A B.T.S. is the element providing the interface between the terrestrial network and the mobile units.

Its task is to provide for exchange on the signalling, speech and data channels between the mobile unit and the G.S.M. network The location of each B.T.S. is defined by the requirement of radio coverage of a precise zone.

In low-density zones, the base transceiver stations cover a large radius of transmission and reception while in high-density zones, base transceiver stations are more numerous and cover smaller zones.

A B.S.C. manages the base transceiver stations that are attached to it. It carries out radio call procedures, release procedures and also communications holding (power control and handover) procedures.

A B.S.C. carries out a function of concentrating the data links which are PCM (Pulse-Code-Modulated) links by enabling the traffic channels coming from the base stations to be concentrated on a restricted number of channels going towards the mobile services switching center (M.S.C.) to which it is attached.

The B.S.C.s are positioned so as to reduce their number and the distance from the PCM links to be used.

The N.S.S. subsystem is made up of an M.S.C. as well as home location registers (H.L.R.) and visited location registers (V.L.R.).

The M.S.C. ensures the conveyance of communications between fixed and mobile subscribers. It is a digital switch capable of performing all the functions necessary to the management of the calls by the mobile subscribers located in its area.

Moreover, it manages the consequences of the mobility of the subscribers. To do so, it uses the V.L.R.s and H.L.R.s. Each mobile switching center has an associated V.L.R.

The layout of the M.S.C./V.L.R. association is done so as to reduce its distance from the B.S.S. system.

An H.L.R. is a data base capable of carrying out the management of the mobile subscribers. It contains the identity of the mobile unit as well as the data elements which, naturally, are continuously variable. The H.L.R. indicates a V.L.R.

The V.L.R. locally stores the data elements needed for the incoming and outgoing calls of the mobile subscribers recorded in its data base. The mobile subscribers are those that are in the location zones managed by the V.L.R.

The radio interface ensures the communication between the mobile unit and the B.T.S. for the transmission of digital signals. It relies on the LAPDm protocol.

The Abis interface is structured so as to convey the users' traffic (phone and data) as well as the signalling between the B.S.C. and the B.T.S.

Consequently, it can be subdivided into two distinct parts, one corresponding to the conveyance of the users' traffic, the other to the conveyance of the signalling related to the setting up of communications and the operation and maintenance of the base station.

The physical access between the B.T.S. and the B.S.C. is obtained by 2048 Kbit/s PCM digital links structured in 32 time intervals of 64 Kbit/s. Each time interval corresponds to a traffic channel used on the radio interface.

The A interface ensures the conveyance of the users' traffic (phone and data) and the signalling between the B.S.S. and N.S.S subsystems.

The conveyance of the users' traffic makes it necessary to allocate terrestrial resources between the B.S.S. and the N.S.S. These terrestrial resources are circuits identified by a time interval number and an PCM link number.

The physical access between the B.S.S. and the N.S.S. is obtained by 2048 Kbit/s PCM digital links structured in 32 time intervals.

When a call is being set up, the mobile station makes a first access on the channel of the cell. In response to this, the B.S.C. allocates a first dedicated channel to the station. After the mobile station has taken this radio channel, there is a path between this station and the B.S.C. The mobile station then uses this path to send an initial message.

Upon the reception of the initial message, the B.S.C. sets up a connection with the M.S.C. on the A interface. This connection is dedicated to this mobile station. These two elements, one on the radio interface and the other on the A interface, constitute a dedicated path of the M.S.C.. The dialog can then take place.

According to an earlier system of observation designed to make local observations, the equipment, as shown in FIG. 2, consists of:

a computer supported by an integrated service digital network (ISDN) link used as a remote control, and by a protocol analyzer enabling the traffic of the network to be observed.

However, this system requires the connection, by means of wire-grips, of the four outputs of the analyzer to the four PCM links to be observed. Now, the observation of an PCM link requires the connection of five wires: 2 for transmission, 2 for reception and 1 ground wire.

A physical A interface comprises several PCM links (a number N of links, this number being not always the same one depending on the interfaces). An analyzer AP has a fixed number of PCM channels to be tested. This number is 4. It is therefore necessary first of all to make 4×5=20 manual connections.

A first disadvantage of this system is that a connection sometimes generates disturbances on the corresponding M.I.C links leading to communications cuts.

A second disadvantage of this system is that it requires a manual connection that has to be made at the site itself. In practice, 20 connections are required for four PCM links to be tested.

Moreover, this making of the manual connection dictates a trip to the M.S.C. which is generally located tens of kilometers away from the place of observation, i.e. from the place in which the equipment for controlling the observation of the traffic is located.

SUMMARY OF THE INVENTION

The present invention makes it possible to overcome these problems and, for this purpose, proposes the connection, between the analyzer and the PCM links, of an automatic switching interface to route an output of the analyzer towards any of the PCM links to be observed.

Moreover the interface can be remote controlled by means of an ISDN link connecting a control unit to the protocol analyzer. Through this link, the protocol analyzer is, so to speak, transferred to the location of the command. The control parameters are transmitted by the analyzer to the switchbox. The switchbox ensures switching between its various outputs and the PCM channels that are to be observed, depending on the instructions that it receives from the analyzer.

The present invention is aimed more particularly at a system for the observation of the traffic of a mobile radio-communications network comprising, per site, a mobile services switching center connected to base station controllers by N digital transmission links (PCM links) and/or a base station controller connected to base transceiver stations by N digital transmission links (PCM links); at least one protocol analyzer comprising n outputs, wherein chiefly the system furthermore comprises means for switching over to n inputs and N outputs, capable of routing the signals of each input to one of the outputs, the n inputs corresponding to the n outputs of the analyzer and the N outputs being connected to the N PCM links to be observed.

According to another characteristic the system comprises a unit for the driving of the protocol analyzer connected to the analyzer by a digital transmission line to achieve the remote control of the running of the analysis of the network and the driving of the switching means.

Advantageously, the line is an integrated services digital network (ISDN) line.

According to another characteristic, the switching means comprise a switching assembly formed by flip-flop circuits and relays and a control unit capable of actuating the switching relays.

According to another characteristic, the switching means can be put into operation or deactivated without any interruption of the telephone calls.

Another object of this invention relates to a switching device for a traffic observation system comprising at least one protocol analyzer (AP) with n outputs, designed to analyze N digital transmission links (PCM links), said device comprising, for this purpose, at least n inputs liable to be connected to the n outputs of an analyzer and at least N outputs liable to be connected to N digital transmission links (PCM), and being capable of routing each input to one of the outputs.

According to another characteristic, the switching device comprises a switching assembly comprising one set of flip-flop circuits per output of the analyzer of the relays so that a relay is placed at each output of each flip-flop circuit and a control unit capable of actuating the switching relays.

The switching device can be connected to the traffic observation system without interruption of the telephone calls.

According to another characteristic, the switching device takes the form of a box that is independent and can be connected to the outputs of the analyzer and to the PCM links to be observed.

BRIEF DESCRIPTION OF THE DRAWINGS

Other advantages and particular features of the invention shall appear from the following description, given by way of a non-restrictive example with reference to the drawings, of which.

MORE DETAILED DESCRIPTION

Figure 1:
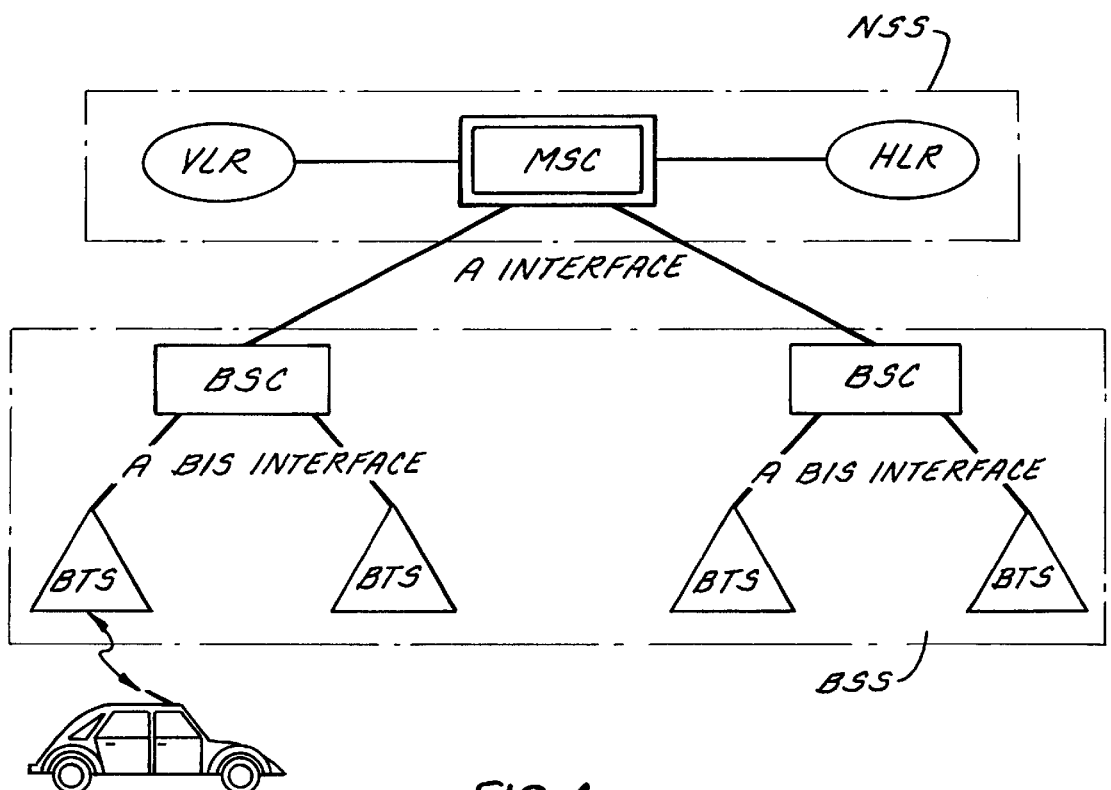
FIG. 1 shows the architecture of a mobile radiotelephony system.
Figure 2:
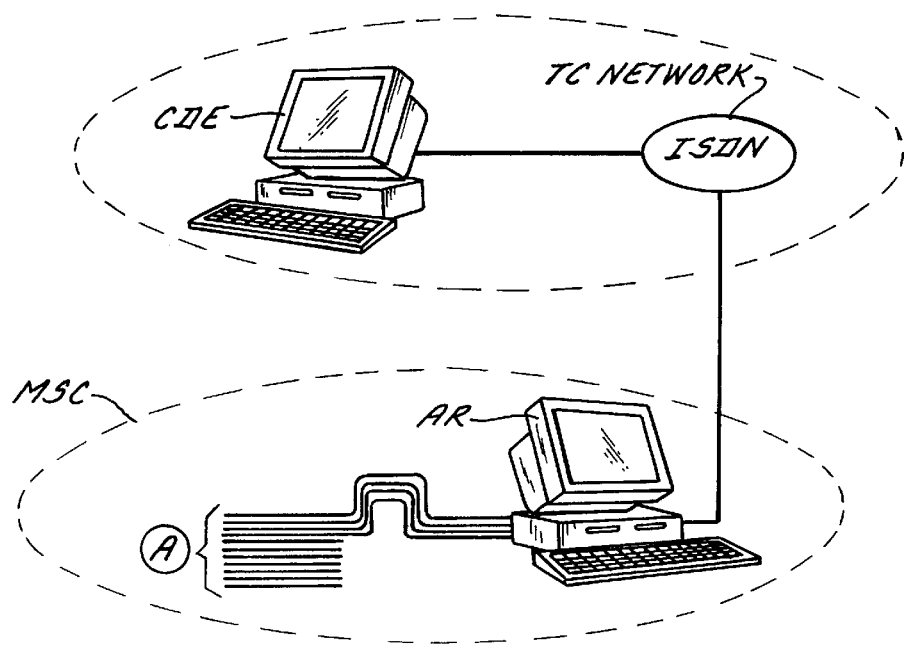
FIG. 2 is a drawing of a system of observation according to the prior art.
Figure 3:
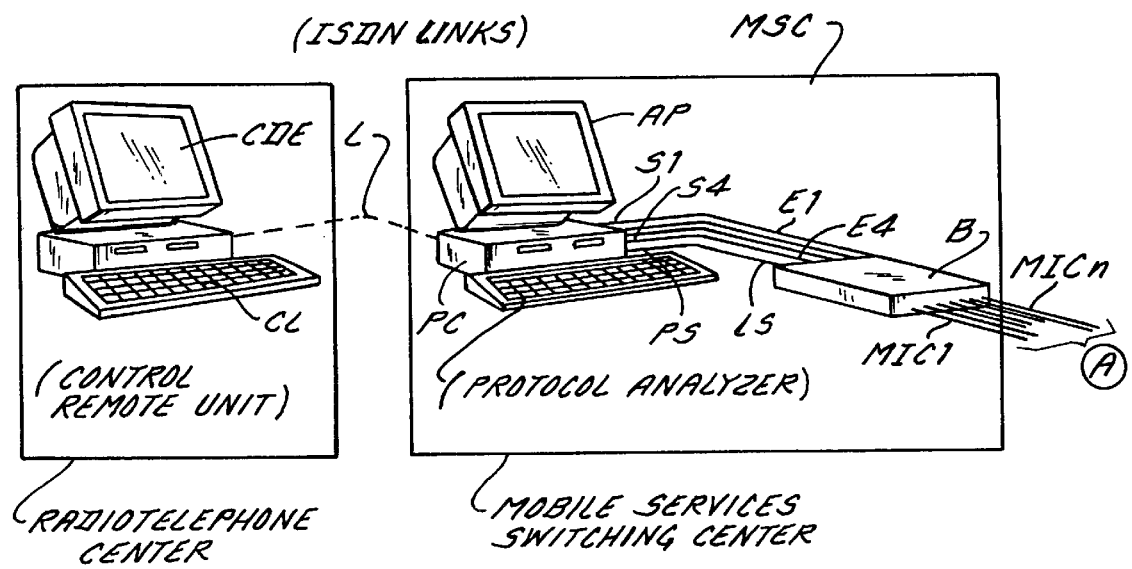
FIG. 3 is a general drawing of the invention.

In the system suggested and schematized in FIG. 3, a protocol analyzer AP (or tester) is connected in each site of the network.

In the case of the GSM standard, a site may be a single-sector site, namely one where each cell is covered by one base station, or a three-sector site, which means that one base station covers three cells.

The switching means may be formed by a device taking the form of an electronic card internal to the protocol analyzer which, in this case, comprises the number of outputs corresponding to the number of PCM channels to be analyzed.

These means may be made in the form of a software program loaded into the analyzer equipped with the appropriate number of outputs.

Advantageously, the switching means are formed by a switchbox that is independent of the protocol analyzer and can be connected to the outputs of the analyzer and to the PCM links to be observed.

In any case, the installation or the deactivation of the switching means does not require the interruption of the traffic of telephone calls.

This switchbox can be used on the A or Abis interface. On the A interface, it will be inserted between the M.S.C and the B.S.C. On the Abis interface, it will be inserted between the B.S.C. and the B.T.S.

Furthermore, the driving unit CDE of the analyzer AP could be placed in a radiotelephone center and will be connected to the analyzer AP by a transmission link L of the switched telephone network. This connection L could for example be an ISDN digital transmission link.

The n outputs s1-sn of the analyzer AP (in practice n=4 with the existing hardware) are connected to the PCM link through the switchbox B. Furthermore, a series port PS of the analyzer AP is connected by a series link LS or switchbox B to transfer the configuration parameters between the analyzer AP and the switchbox B.

In the practical example that shall be described, the analyzer AP used is the protocol analyzer K1103 by SIEMENS having 4 outputs s1, s2, s3, s4 (n=4).

This is a passive analyzer for the decoding and analysis of the CCIT telecommunication protocol No. 7 used for signalling. It consists of the following elements (not specified):

a P.C. type central processing unit associated with:
   an acquisition card with its rate set at 20 MHz enabling the analyzer to be connected to the interface module and,
   an interface module enabling the observation of the signalling conveyed on an PCM link.

The control unit CDE fulfils the remote control function for the switchbox through the analyzer AP and for said analyzer. It is made up of a P.C. type central processing unit connected to a connection pack of the ISDN network (not shown) and loaded with a program for the remote driving of the analyzer.

This program makes it possible to launch the communication with the analyzer at the request of a user. Once the communication has been set up, the user can enter the configuration parameters of the switchbox into the unit CDE exactly as if he were doing it directly on the analyzer. The screen of the analyzer AP is reflected on the control unit.

These parameters correspond to the choice relating to the desired routing operations between the inputs E1–En and outputs S1–SN of the switchbox B.

The remote control program executed by the control unit CDE is capable of enabling the control of the application executed by the protocol analyzer AP. This is achieved by the striking of keys on the keyboard CL and the clicking of the mouse of this control unit CDE and through the display, on its screen, of the images that are on the remote screen (the screen of the analyzer).

The A interface, just like the Abis interface according to the GSM standard, comprises a variable number N of PCM links. The observation of an PCM requires the connection of two wires for transmission, two wires for reception and one ground wire.

In the practical exemplary embodiment given, the switchbox was selected so as to have n=4 inputs corresponding to the 4 outputs of the analyzer and N=24 outputs corresponding to the 24 PCM links of the A interface.

Another advantage of this invention is that it becomes quite possible to connect two protocol analyzers or more to the A or Abis interface. It will be necessary in this case to provide a number of inputs for the switchbox that is equal to n times the number of analyzers.

Moreover this switchbox is transparent with respect to the analyzer. It simply enables a routing of the ports of the analyzer.

In the example given, the switchbox enables the routing of each input E1–E4 to one of the outputs S1–S24, it being impossible for an output to be connected to two different inputs.

In order not to disturb the 120 ohm PCM link to which the switchbox is connected in parallel, the impedance of this switchbox is infinite.

The GSM protocols that can be decoded by the analyzer K1103 are based on a protocol stacking mechanism. Certain protocols differ according to the interface (A or Abis) that is to be observed. The A interface provides mainly for the management of the network while the Abis interface pertains to the management of the mobile.

The protocol analyzer AP in particular makes it possible to monitor and analyze signalling errors of the GSM digital telephone network on the A and Abis interface. It analyzes the signalling in both directions of the transmission which is made up of a transmission pair and a reception pair.

The protocol analyzer AP enables the observation of a maximum of four PCM links between two points of the network, for example between the B.S.C. and the M.S.C.

Figure 4:
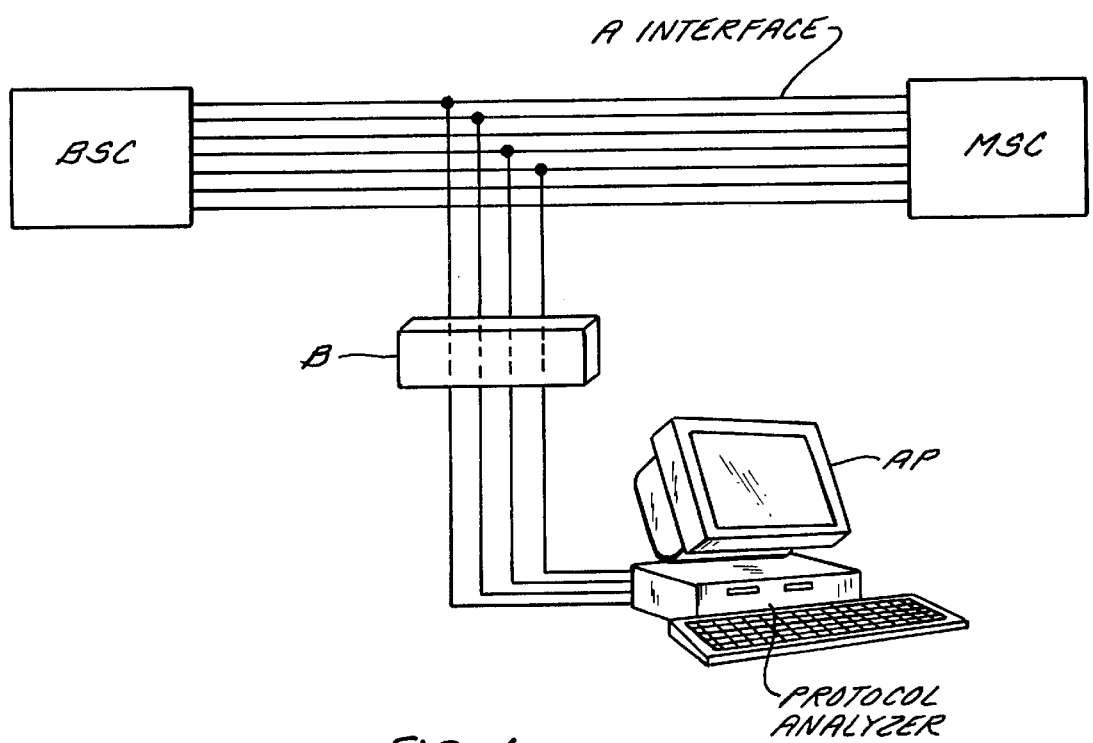
FIG. 4 is a drawing illustrating the analysis of the signalling between two points of the network.

FIG. 4 illustrates this application. The bit rate of the bipolar signals observed is 2048 Kbit/s. These signals have a peak-to-peak amplitude of 6 volts corresponding to an HDB3 type encoding.

Figure 5:
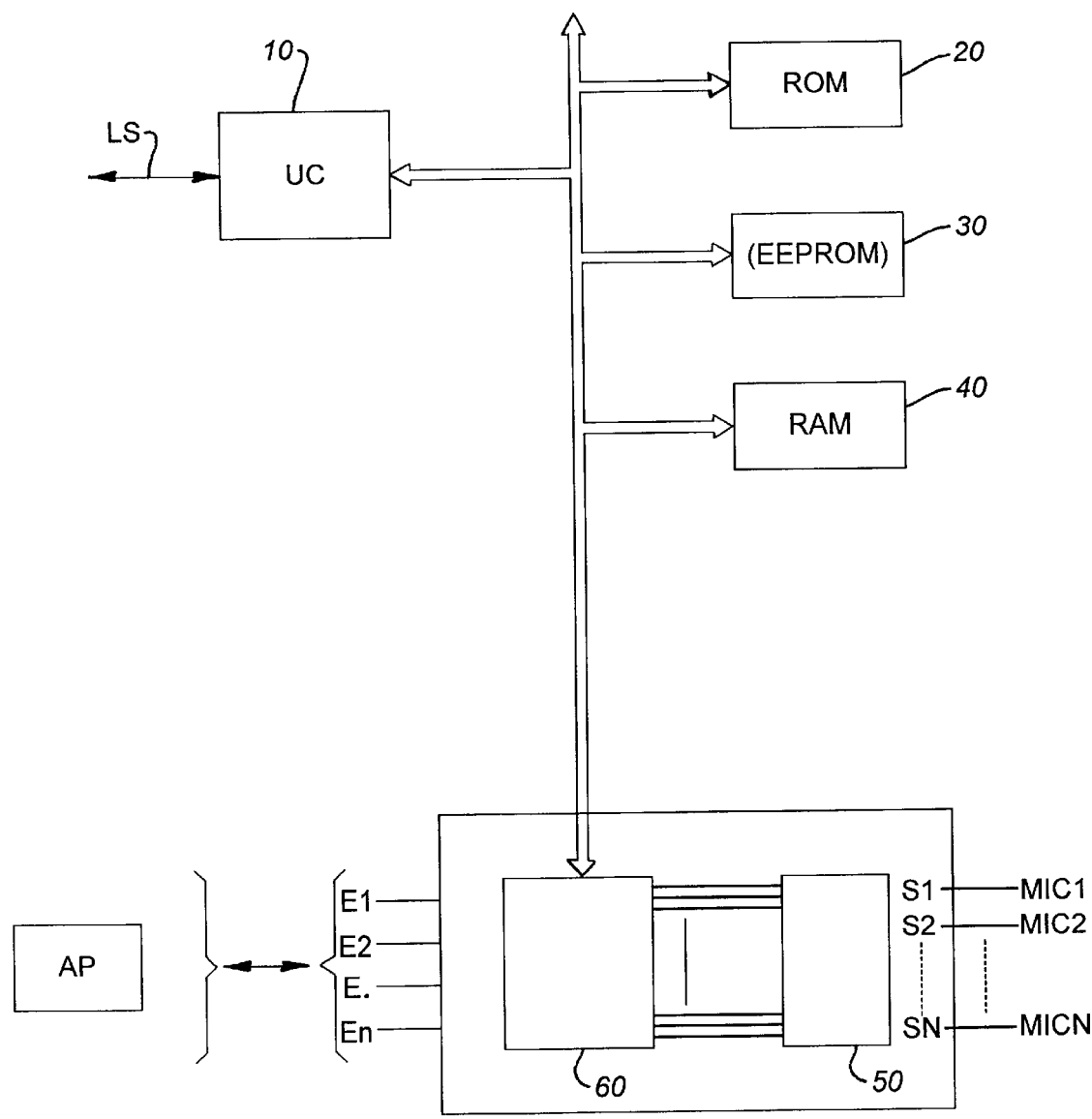
FIG. 5 shows a more detailed drawing of the switchbox.

A more detailed description shall now be given of the making of the switchbox with reference to the drawing of FIG. 5.

This switchbox comprises a control unit 10 which is made according to the exemplary application given by a microcontroller such as the microcontroller referred MC68HC11 using the HCMOS technology, the advantage of which is that it combines a small size with a fast 2 MHz bus and low power consumption.

The memory chip comprises 8 kilobytes of non-volatile memory. It is the program memory (ROM) 20 of the microcontroller and it contains a program capable of actuating the appropriate flip-flop circuits (as specified hereinafter) according to the parameters of configuration received by the microcontroller. This memory chip furthermore comprises 512 bytes of electrically erasable and programmable (EEPROM) program memory 30 to enable the updating of the program of the ROM and 256 bytes of working memory 40.

The switchbox furthermore comprises a switching assembly comprising relay switches 50 and the flip-flop circuits 60.

The use of mechanical switching is made possible by the frequency of the signals to be observed and the time available for the routing. Indeed, the analysis of the signalling is activated remotely after the activation and the execution of the configuration program for the switchbox B.

Each of the n inputs of the switchbox B is capable of being switched over to one of the N outputs and, for this reason, n×N relays are used, that is to say 4×24 in the exemplary implementation given here above.

Figure 6:
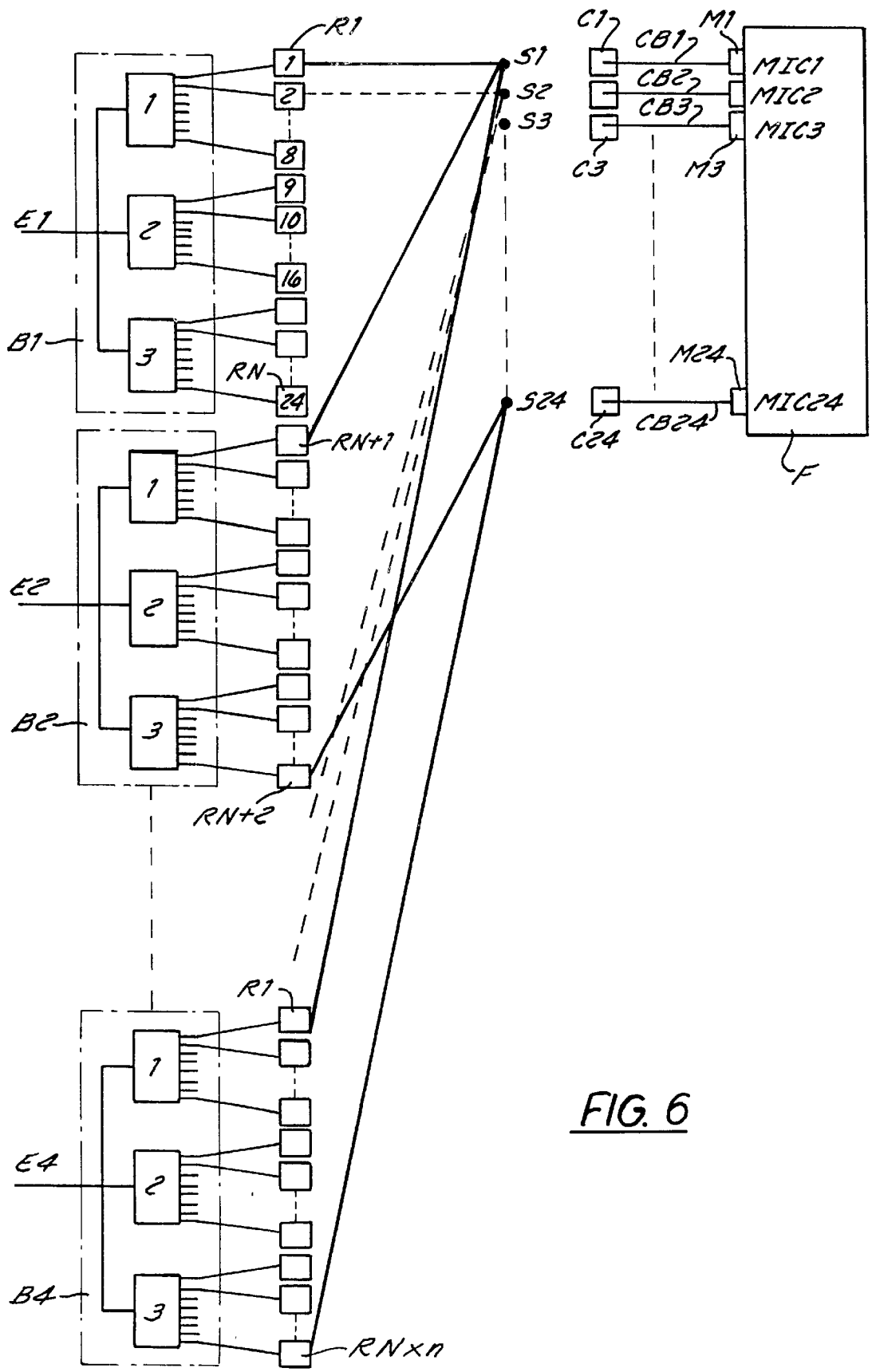
FIG. 6 shows a functional diagram of the switching assembly.

The drawing of FIG. 6 illustrates the functional implementation of the switching assembly 50 and 60. Again, according to this example, the actuation of the relays is controlled by n=4 sets of flip-flop circuits B1–B4, i.e. in practice 12 eight-bit flip-flop circuits of (3 flip-flop circuits 1, 2, 3 for each input E1 or E2 . . . or E4). A one-megahertz series clock synchronizes the input of the data on the leading edge in the flip-flop circuits.

Each input E1–E4 uses 3 flip-flop circuits, that is to say 24 bits necessary to encode each of the 24 outputs S1 to S24.

To connect an input E1 to the PCM link No. 8, a 24-bit word is sent. This word corresponds to:

00000000/00000001/00000000

1st byte 2nd byte 3rd byte

Before any parameter-setting operation, the relays are such that no input or output is connected.

The driving program installed on the analyzer AP asks the user for the number of the PCM link that he wishes to observe on each of four inputs E1–E4. The program converts the number received into a 3-digit (3-byte) form, sending these three bytes one after the other on the series link LS. The transmission is securitized To this end, as soon as the first byte is received by the microcontroller 10 of the switchbox B, this switchbox returns said first byte to the analyzer AP. Once the 3 bytes have been sent and received, the analyzer AP compares the sum of the bytes sent with the sum of the bytes received. If these sums are different, the driving program of the switchbox again asks for the number of the PCM.

Once the 12 bytes have been sent correctly on the (RS232 type) series link, the corresponding relays R1 to RN, or RN+1 to R2N, or . . . R3N+1 to R4N switch over. The connections desired between the inputs and the outputs are set up. The user can then configure the protocol analyzer and observe the traffic of the network.

If the program installed on the analyzer no longer answers, the switchbox automatically performs a reset at the end of 2 minutes. The switchbox will not connect any outputs to the inputs.

The relays used are bistable relays with change-over contacts made up of two coils installed on a magnetic circuit (electromagnet) and several change-over contacts (with common point switching).

This assembly makes it possible to obtain instantaneous switching as soon as the connection is made, thus making the observation system even more transparent to the application as compared with the prior art system.

Moreover the invention provides for great facility of installation in addition to this transparency since the five wires of each PCM link are brought together on an fixed assembly F (of the multiple-connection strip type receiving wires from the transmission distribution frame and from the reception distribution frame).

Connection cords CB1–CB24 are designed so that each contains one wire of an PCM link. These cords are furthermore provided, at one end, with connectors M1–M24 designed to be connected to the fixed assembly F. At the other end, they are provided with connectors C1–C24 which can be connected, without distinction, to the outputs S1–S24 of the switchbox B or to the outputs of the analyzer AP.

It will thus be very easy, in cases where the switchbox is not necessary, to simply withdraw it by disconnecting the connectors C1–C24.

What is claimed is:

1. A system for the observation of traffic in a mobile radiocommunications network comprising:
    a mobile services switching center connected to a plurality of base station controllers by a first plurality of digital transmission links $N_1$, wherein each base stations controller is connected to a plurality of base transceiver stations by a second plurality of digital transmission links $N_2$;
    at least one protocol analyzer including a plurality of n outputs; and
    switching means for switching over to a plurality of n inputs and a plurality of $N_1+N_2$ outputs, and routing a plurality of signals corresponding to each of the n inputs to one of the plurality of $N_1+N_2$ outputs, wherein each one of the n inputs corresponds to one of the plurality of n outputs of the protocol analyzer.

2. The system according to claim 1, wherein a unit for driving the protocol analyzer is connected to the protocol analyzer by a digital transmission line to remotely control analysis of the system and operation of the switching means.

3. The system according to claim 2, wherein the digital transmission line is an integrated services digital network (ISDN) line.

4. The system according to claim 1, wherein the switching means further includes a switching assembly having a plurality of flip-flop circuits, a plurality of relays, and a control unit for actuating the plurality of relays.

5. The system according to claim 1, wherein each of a plurality of telephone calls on the system are not interrupted when the switching means is activated and deactivated.

6. The system according to claim 1, wherein the switching means further includes a switching assembly having a set of flip-flop circuits having a plurality of outputs that correspond to each of the plurality of outputs of the protocol analyzer and a plurality of relays, wherein each of the plurality of relays is placed at each of the plurality of outputs of the flip-flop circuits and a control unit actuates the plurality of relays.

7. The system according to claim 6, wherein the switching assembly is a box that is connected to each of the plurality of outputs of the protocol analyzer and the first plurality and the second plurality of digital transmission links.

8. A switching device for a traffic observation system comprising:
    at least one protocol analyzer having a plurality of n outputs configured to analyze a plurality of N digital transmission links;
    a plurality of n inputs connected to each of the plurality of n outputs of the protocol analyzer;
    a plurality of N outputs connected to each of the plurality of N digital transmission links, wherein the switching device routes each of the plurality of n inputs to one of the plurality of N outputs, and wherein the same protocol analyzer observes the N transmission links independent of the number of n inputs to the protocol analyzer; and
    wherein the switching device further includes a switching assembly having a set of flip-flop circuits having a plurality of outputs that correspond to each of the plurality of outputs of the protocol analyzer and a plurality of relays, wherein each of the plurality of relays is placed at each of the plurality of outputs of the flip-flop circuits and a control unit actuates the plurality of relays.

9. The switching device according to claim 8, wherein each of a plurality of telephone calls on the system are not interrupted when the switching device is activated and deactivated.

10. The switching device according to claim 8, wherein the switching device is a box that is connected to each of the plurality of outputs of the protocol analyzer and the plurality of N outputs corresponding to the plurality of digital transmission links.

11. A system for the observation of traffic in a mobile radiocommunications network comprising:
    a mobile services switching center connected to a plurality of base station controllers by a plurality of digital transmission links N;
    at least one protocol analyzer including a plurality of n outputs;
    switching means for switching over to a plurality of n inputs and a plurality of N outputs, and routing a plurality of signals corresponding to each of the n inputs to one of the plurality of N outputs, wherein each one of the n inputs corresponds to one of the plurality of n outputs of the protocol analyzer, and wherein the same protocol analyzer observes the N transmission links independent of the number of n inputs to the protocol analyzer; and
    wherein the switching means other includes a switching assembly having a set of flip-flop circuits having a plurality of outputs that correspond to each of the plurality of outputs of the protocol analyzer and a plurality of relays, wherein each of the plurality of relays is placed at each of the plurality of outputs of the flip-flop circuits and a control unit actuates the plurality of relays.

12. The system according to claim 11, wherein a unit for driving the protocol analyzer is connected to the protocol analyzer by a digital transmission line to remotely control analysis of the system and operation of the switching means.

13. The system according to claim 11, wherein the switching assembly is a box that is connected to each of the plurality of outputs of the protocol analyzer and the plurality of digital transmission links N.

14. A system for the observation of traffic in a mobile radiocommunications network comprising:
    a base station controller connected to a plurality of base transceiver stations by a plurality of digital transmission links N;
    at least one protocol analyzer including a plurality of n outputs;
    switching means for switching over to a plurality of n inputs and a plurality of N outputs, and routing a plurality of signals corresponding to each of the n inputs to one of the plurality of N outputs, wherein each one of the n inputs corresponds to one of the plurality of n outputs of the protocol analyzer, and wherein the same protocol analyzer observes the N transmission links independent of the number of n inputs to the protocol analyzer; and wherein the switching means further includes a switching assembly having a set of flip-flop circuits having a plurality of outputs that correspond to each of the plurality of outputs of the protocol analyzer and a plurality of relays, wherein each of the plurality of relays is placed at each of the plurality of outputs of the flip-flop circuits and a control unit actuates the plurality of relays.

15. The system according to claim 14, wherein a unit for driving the protocol analyzer is connected to the protocol analyzer by a digital transmission line to remotely control analysis of the system and operation of the switching means.

16. The system according to claim 14, wherein the switching assembly is a box that is connected to each of the plurality of outputs of the protocol analyzer and the plurality of digital transmission links N.

* * * * *